United States Patent [19]

Sawada et al.

[11] Patent Number: 5,354,503

[45] Date of Patent: Oct. 11, 1994

[54] LIQUID CRYSTAL COMPOSITION AND LIQUID DISPLAY USING SAID COMPOSITION

[75] Inventors: Shinichi Sawada; Akiko Fukuda, both of Ichiharashi, Japan

[73] Assignee: Chisso Corporation, Osaka, Japan

[21] Appl. No.: 935,346

[22] Filed: Aug. 28, 1992

Related U.S. Application Data

[63] Continuation of Ser. No. 508,361, Apr. 12, 1990, abandoned.

[30] Foreign Application Priority Data

Apr. 17, 1989 [JP] Japan .................. 1-96686

[51] Int. Cl.⁵ .............. C09K 19/30; C09K 19/12; C09K 19/06
[52] U.S. Cl. .............. 252/299.63; 252/299.66; 252/299.67
[58] Field of Search ............ 252/299.66, 299.68, 252/299.63

[56] References Cited

U.S. PATENT DOCUMENTS

| | | | |
|---|---|---|---|
| 4,261,651 | 4/1981 | Gray et al. | 350/350 R |
| 4,670,182 | 6/1987 | Fujita et al. | 252/299.61 |
| 4,695,131 | 9/1987 | Balkwill et al. | 350/350 R |
| 4,737,311 | 4/1988 | Scheuble et al. | 252/299.61 |
| 4,822,519 | 4/1989 | Saito et al. | 252/299.61 |
| 4,834,906 | 5/1989 | Coates et al. | 252/299.63 |
| 4,874,543 | 10/1989 | Yoshida | 252/299.61 |
| 4,877,549 | 10/1989 | Sawada et al. | 252/299.63 |
| 4,917,818 | 4/1990 | Sawada et al. | 252/299.61 |
| 4,917,819 | 4/1990 | Goto et al. | 252/299.63 |
| 4,944,577 | 7/1990 | Yoshida et al. | 350/346 |
| 4,979,228 | 1/1989 | Goto et al. | 252/299.63 |
| 5,167,860 | 12/1992 | Sawada et al. | 252/299.63 |
| 5,207,944 | 5/1993 | Sawada et al. | 252/299.01 |

FOREIGN PATENT DOCUMENTS 63-289089 11/1988 Japan .................. 350/350 R

*Primary Examiner*—Robert L. Stoll
*Assistant Examiner*—C. Harris

*Attorney, Agent, or Firm*—Leydig, Voit & Mayer

[57] ABSTRACT

Liquid crystal compositions and displays using the compositions are disclosed. The compositions contains at least one compound represented by the general formula (I), at least one compound represented by the general formula (II), and at least one compound represented by the general formula (III), or as well as the above compounds, at least one compound represented by the general formula (IV) as main components.

General Formula (I):

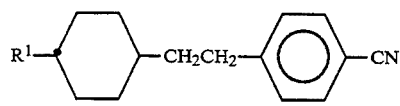

General Formula (II):

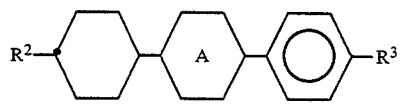

General Formula (III):

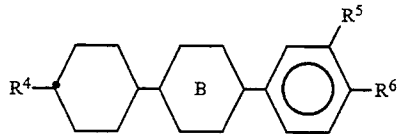

General Formula (IV):

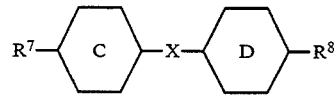

wherein $R^1$, $R^2$, $R^3$, $R^4$, $R^7$ and $R^8$ are independently alkyl groups having 1 to 10 carbon atoms; $R^3$ and $R^8$ each may also independently be an alkoxy group having 1 to 10 carbon atoms; $R^7$ may also be an alkoxymethyl group having 1 to 11 carbon atoms; $R^5$ is H; $R^6$ is a CN group;

(Abstract continued on next page.)

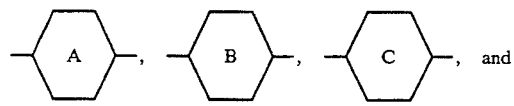 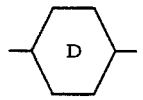
are each independently
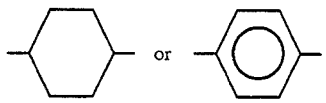
and X is a single bond, —COO—, or —C≡C—.
34 Claims, No Drawings

LIQUID CRYSTAL COMPOSITION AND LIQUID DISPLAY USING SAID COMPOSITION

This application is a continuation of application Ser. No. 07/508,361, filed Apr. 12, 1990 abandoned.

FIELD OF THE INVENTION

The present invention relates to a liquid crystal composition for liquid crystal displays and a liquid crystal display using the liquid crystal composition. More particularly, it is concerned with a liquid crystal composition suitable for use in multiplexed liquid crystal displays utilizing the supertwisted birefringence effect and a liquid crystal display using the liquid crystal composition.

BACKGROUND OF THE INVENTION

In recent years, with a rapid growth of information displays, particularly portable data terminals, a small sized, thin, and low electric power consumption type display having a display capacity and display quality compatible to those of the conventional CRTs (cathode ray tubes) has been increasingly demanded.

The conventional liquid crystal displays have been used as display terminals of up to about a 1/100 duty cycle, such as watches and electric calculators, utilizing multiplexing of a TN (twisted nematic) liquid crystal cell having a twist angle of 90°. In view of the principle, it has been believed that it is difficult to increase the number of duty cycles to more than the above value, because it is accompanied by a reduction of display quality.

Thus a supertwisted birefringence effect mode utilizing the birefringence effect of a liquid crystal cell in which the highest possible twist angle to produce bistability, one of electro-optic characteristics of a chiral nematic liquid crystal, is controlled between 180° and 270° has been developed. This mode is referred to an "SBE mode", including supertwisted nematic modes using an aligning organic film, called an STN mode and an HBE mode.

T.J. Scheffer & J. Nehling disclosed in Appl. Phys. Lett., 45, 1021 (1984) that the above SBE mode can provide a matrix display in which a display device is driven in the same driving manner as that in a matrix display of the conventional 90° twisted TN mode, i.e., the fast scan addressing mode responding to the effective value of applied voltage. It is also reported that the SBE mode display has a much higher contrast and a much wider viewing angle than the 90° twisted TN display.

In connection with a liquid crystal material, to make a voltage-transmittance curve of the conventional 90° twisted nematic mode display steep, it is necessary to minimize an elastic constant ratio $K_{33}/K_{11}$ of a liquid crystal material to be used (see, for example, G. Bauer, The Physics and Chemistry of Liquid Crystal Devices (edited by G.J. Sprokel), pp. 61–78 (1980)). In the SBE mode, however, to make the voltage transmittance curve steep, it is necessary to make $K_{33}/K_{11}$ as large as possible unlike in the 90° TN mode, and $K_{33}/K_{22}$ is desirable to be larger (see, for example, C.M. Waters, Design of Highly Multiplexed Liquid Crystal Dye Displays, Mol. Cryst. Liq. Cryst., 1985, Vol. 123, pp. 303–319).

$K_{11}$, $K_{22}$ and $K_{33}$ as used herein refer to splay, twist, and bend elastic constants, respectively, in the Frank's continuum theory (F. Frank, Disc Faraday Soc., 25, p. 19 (1958)).

As described above, a physical property value required for making a voltage-transmittance curve steep, i.e., elastic constant ratio $K_{33}/K_{11}$ is in a completely reverse relationship between the conventional 90° TN and SBE modes. For this reason, liquid crystal compositions conventionally used in the 90° TN mode are generally unsuitable for use to make a voltage-transmittance curve steep in the SBE mode and cannot be used in the SBE mode display as they are.

The main characteristics required for liquid crystal compositions to be suitable for use in SBE mode displays are:

(1) a voltage-transmittance curve is steep (steepness of voltage-transmittance curve);

(2) a nematic-isotropic liquid phase transition temperature, i.e., clearing point (NI) is high;

(3) refractive index anisotropy (Δn) can be suitably controlled depending on a cell thickness (d); and (4) viscosity (η) is low.

The characteristic (1) above is necessary for increasing display contrast of a liquid crystal display of the SBE mode.

The characteristic (2) is needed to avoid coloring of the display due to temperature dependency of Δn in the SBE mode; the clearing point is desired to be as high as possible. The reason for this is that the value of Δn generally decreases gradually as the temperature increases; that is, it is generally a gradually decreasing curve from the lower temperature side to the higher temperature side, and in the vicinity of the clearing point, it begins to decrease markedly, leading to a great change in the optical path (Δn·d) and further to a change in color of the display. At the clearing point where Δn reaches 0, the liquid crystal composition becomes an isotropic liquid, losing its function as a liquid crystal. From a practical point of view, the clearing point is preferably at least 85° C.

The characteristic (3) is necessary for increasing the degree of freedom of d of a liquid crystal display cell. The reason for this is that as the SBE mode employs interference color for display, the color being produced by the birefringence effect due to an optical path (Δn·d=constant) of birefringence, unlike the conventional TN mode, it is desirable that the Δn of a liquid crystal composition can be adjusted to a suitable value depending on d.

The characteristic (4) is particularly effective in shortening the response time in a liquid crystal cell of the SBE mode. With regard to the response time in the TN mode, it is known that both rising and falling times are in proportion to $\Delta \cdot d^2$. This relationship is applicable to the SBE mode as well.

In fact, however, the conventional liquid crystal compositions fail to satisfy the above requirements; a liquid crystal composition satisfying the above requirements and thus suitable for use in displays of the SBE mode has not been found heretofore.

SUMMARY OF THE INVENTION

An object of the present invention is to provide a liquid crystal composition which has a high clearing point and low viscosity, and in which Δn can be controlled to a suitable value depending on d, and furthermore which is excellent in the steepness of the voltage-transmittance curve.

Another object of the present invention is to provide a liquid crystal display excellent in the steepness of the voltage-transmittance curve, and having good contrast.

It has been found that the above objects can be attained by combining the specified compounds represented by the general formulas (I), (II), (III) and (IV) as shown hereinafter.

The present invention relates to a liquid crystal composition containing at least one compound represented by the general formula (I) (first component), at least one compound represented by the general formula (II) (second component), and at least one compound represented by the general formula (III) (third component) as main components.

The present invention further relates to a liquid crystal composition containing at least one compound represented by the general formula (I) (first component), at least one compound represented by the general formula (II) (second component), at least one compound represented by the general formula (III) (third component), and at least one compound represented by the general formula (IV) (fourth component) as main components.

The present invention further relates to a liquid crystal display using any one of the above liquid crystal compositions.

General Formula (I):

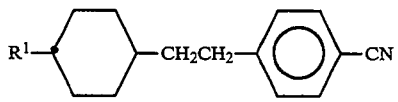

(wherein $R^1$ is an alkyl group having 1 to 10 carbon atoms, preferably a straight alkyl group).

General Formula (II):

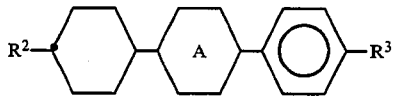

(wherein $R^2$ is an alkyl group having 1 to 10 carbon atoms, preferably a straight alkyl group; $R^3$ is an alkyl group having 1 to 10 carbon atoms, preferably a straight alkyl group, or an alkoxy group having 1 to 10 carbon atoms, preferably a straight alkoxy group; and

General Formula (III):

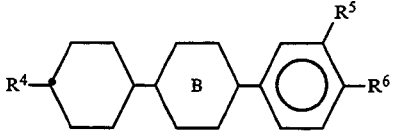

(wherein $R^4$ is an alkyl group having 1 to 10 carbon atoms, preferably a straight alkyl group; $R^5$ is H or F; $R^6$ is F or a CN group; and

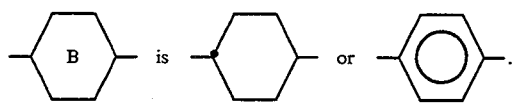

General Formula (IV):

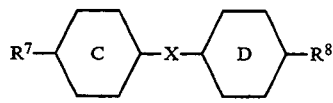

(wherein $R^7$ is an alkyl group having 1 to 10 carbon atoms, preferably a straight alkyl group; or an alkoxymethyl group having 1 to 11 carbon atoms, preferably a straight alkoxymethyl group; $R^8$ is an alkyl group having 1 to 10 carbon atoms, preferably a straight alkyl group, or an alkoxy group having 1 to 10 carbon atoms, preferably a straight alkoxy group; and

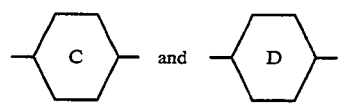

may be the same or different and are independently

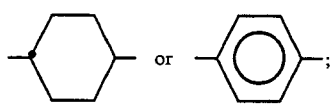

and X is a single bond, —COO—, or —C≡C—.).

In the present invention,

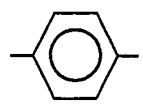

represents a p-phenylene ring, and

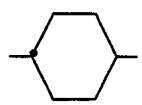

represents a transcyclohexylene ring.

DETAILED DESCRIPTION OF THE INVENTION

The first component of the present invention comprises one or more compounds represented by the general formula (I). Of the compounds of the general formula (I), compounds in which $R^1$ is a straight alkyl group having 2 to 5 carbon atoms are preferably used.

Examples of such preferred compounds are shown below.

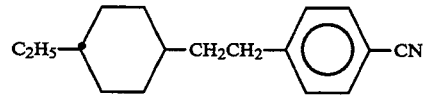

-continued

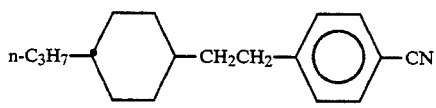

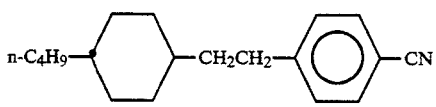

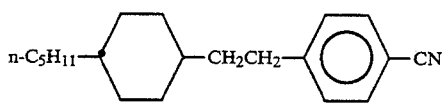

The compounds of the general formula (I) are known and are described in Japanese Patent Publication No. 27785/1983.

Physical properties of a mixture of the compounds shown below as selected from the compounds of the general formula (I) are shown in Table 1.

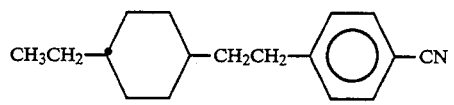
17 wt %

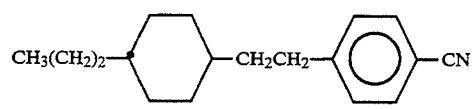
40 wt %

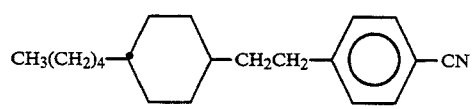
43 wt %

TABLE 1

| | |
| --- | --- |
| Melting Point (mp) (°C.) | −1.0 |
| NI (°C.) | 40.8 |
| η (cp) (20° C.) | 23.5 |
| Δn (25° C.) | 0.113 |
| Δε (25° C.) | 9.79 |
| $K_{33}/K_{11}$ (25° C.) | 2.22 |
| $K_{33}/K_{22}$ (25° C.) | 2.74 |

The symbols, NI, η, Δn, $K_{11}$, $K_{22}$ and $K_{33}$, in Table 1 are as defined above, and Δε represents dielectric anisotropy. All the values except for η(20° C.) are measured at 25° C. This is the same in Tables 2 to 4 as described hereinafter.

As apparent from Table 1, the compounds of the general formula (I) are low in viscosity and refractive index anisotropy although they have high dielectric anisotropy. Furthermore, the above mixture prepared by mixing only three compounds exhibits a wide liquid crystal temperature range. Moreover, it can be said that as $K_{33}/K_{11}$ and $K_{33}/K_{22}$ are large, the compounds of the general formula (I) are suitable for use in the SBE mode. $K_{33}/K_{11}$ and $K_{33}/K_{22}$ of 4'-pentyl-4-cyanobiphenyl, liquid crystal at room temperature as commonly used in the TN mode, are 1.30 and 2.39, respectively.

When two or more of the compounds represented by the general formula (I) are used in combination with each other as the first component, the proportions of the compounds used is not critical and can be determined appropriately depending on the desired characteristics of a liquid crystal composition to be prepared.

The second component of the present invention comprises one or more of the compounds represented by the general formula (II), more specifically the compounds represented by the general formulas:

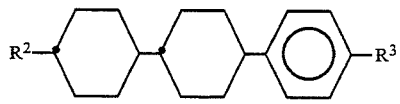

and

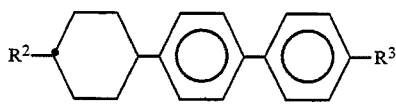

(wherein $R^2$ and $R^3$ are the same as defined above). Of these compounds, compounds in which $R^2$ is a straight alkyl group having 2 to 5 carbon atoms, and $R^3$ is a straight alkyl group having 1 to 5 carbon atoms, or a straight alkoxy group having 1 to 5 carbon atoms are preferably used.

Examples of such preferred compounds are shown below.

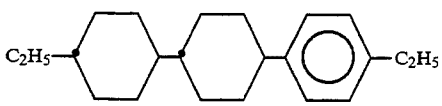

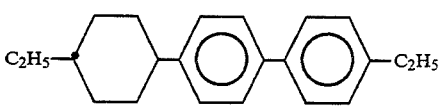

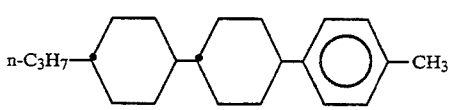

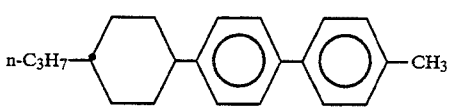

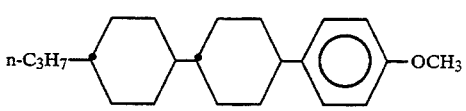

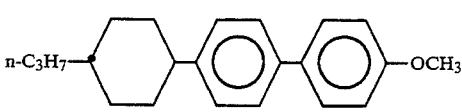

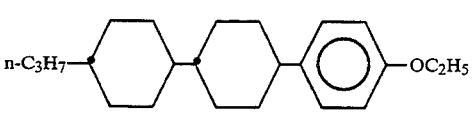

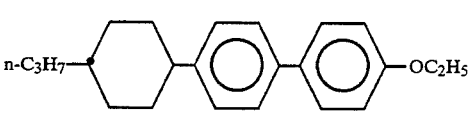

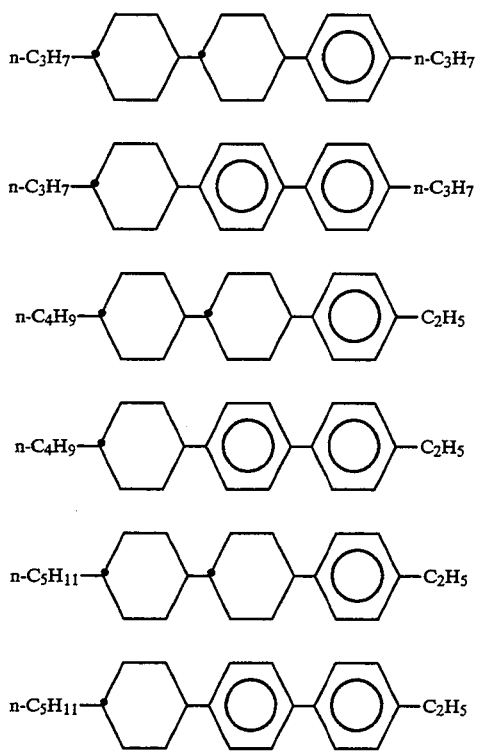

The compounds of the general formula (II) are known, and are described in, for example, Japanese Patent Publication No. 34928/1985 and Japanese Patent Application Laid-Open No. 165328/1982.

Compounds (B1) to (B3) shown below, as selected from the compounds of the general formula (II) were dissolved each in a proportion of 15% by weight in a commercially available cyclohexylbenzonitrile-based liquid crystal (trade name: ZLI-1083, produced by Merck & Co.) and measured for physical properties. The results are shown in Table 2.

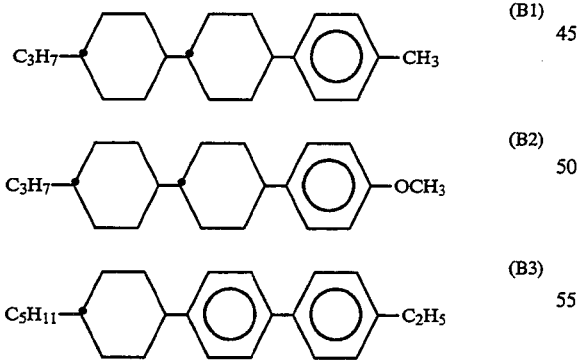

TABLE 2

|  | B1 | B2 | B3 | ZLI-1083 |
|---|---|---|---|---|
| NI (°C.) | 66.8 | 70.7 | 65.3 | 52.3 |
| $\eta$ (cp) | 20.0 | 21.5 | 20.1 | 21.7 |
| $\Delta n$ | 0.121 | 0.121 | 0.127 | 0.119 |
| $\Delta\epsilon$ | 9.9 | 10.2 | 9.9 | 10.7 |

As apparent from Table 2, the compounds of the general formula (II) have low viscosity and a high clearing point. Moreover, they have similar physical properties, for example, negative dielectric anisotropy.

When more than one of the compounds represented by the general formula (II) are used in combination with each other as the second component, the proportions of the compounds used are not critical and can be determined appropriately depending on the characteristics of the desired liquid crystal composition.

The third component of the present invention comprises one or more of the compounds represented by the general formula (III), more specifically the compounds represented by the general formulas:

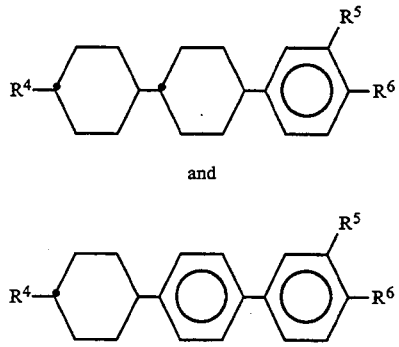

and wherein $R^4$, $R^5$ and $R^6$ are the same as defined above).

Examples of the above compounds are shown below.

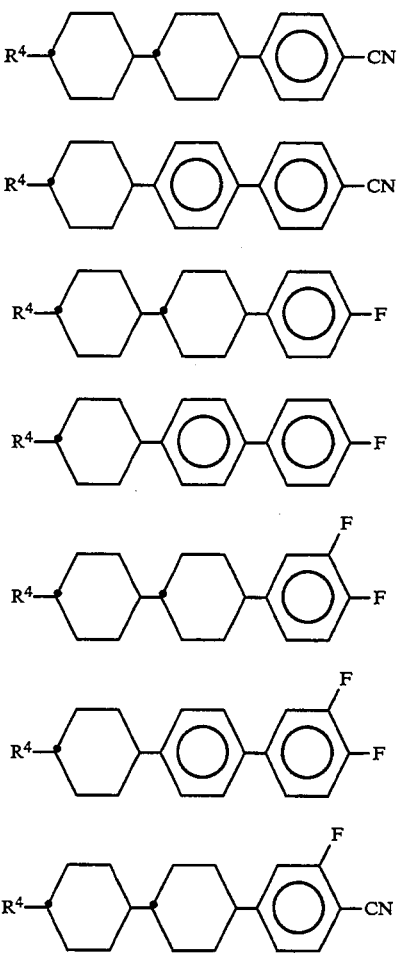

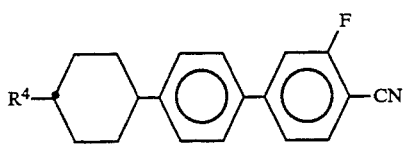

(wherein R⁴ is the same as defined above).

Of these compounds, compounds represented by the general formula:

or the general formula:

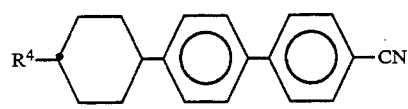

(wherein R⁴ is the same as defined above, preferably a straight alkyl group having 2 to 5 carbon atoms) are preferably used.

Examples of such preferred compounds are shown below.

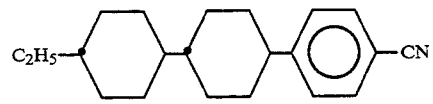

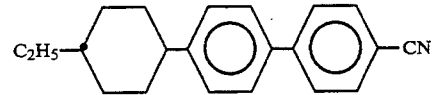

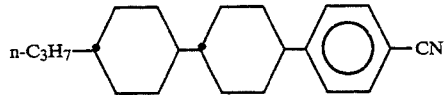

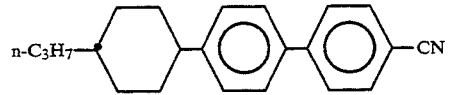

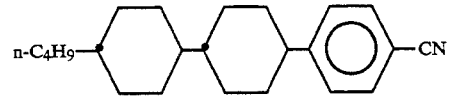

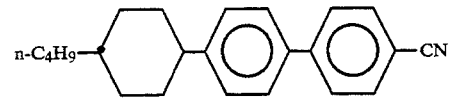

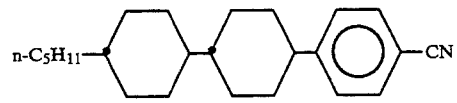

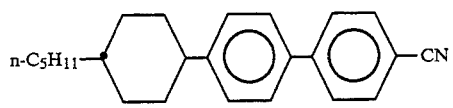

The compounds of the general formula (III) are known and are described, for example, in Japanese Patent Publication Nos. 3324/1983, 4496/1989, Japanese Patent Application Laid-Open Nos. 169633/1981, 64626/1982, 154135/1982, 15236/1984 and 4496/1989.

Compounds (C1) to (C7) shown below, as selected from the compounds of the general formula (III) were dissolved in the same liquid crystal (ZLI-1083) as used above each in a proportion of 15% by weight, and measured for physical properties. The results are shown in Table 3.

(C1)
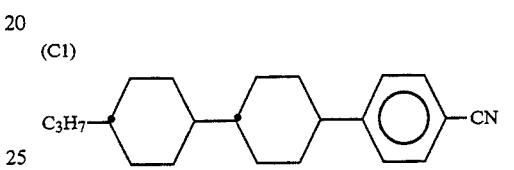

(C2)
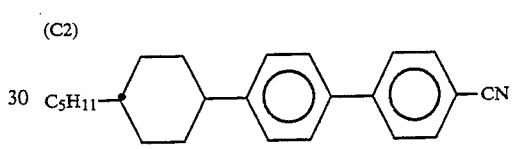

(C3)
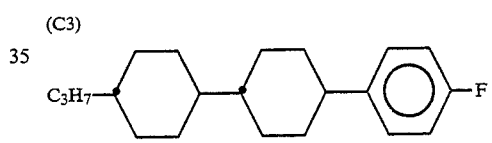

(C4)
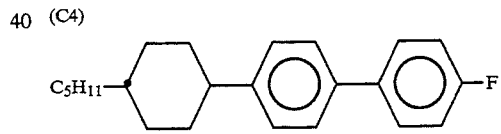

(C5)
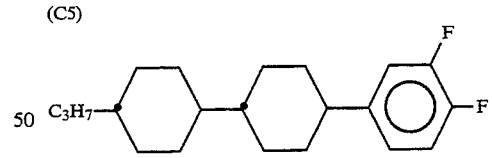

(C6)
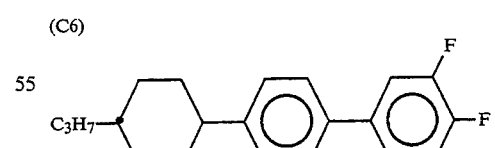

(C7)

TABLE 3

|  | NI (°C.) | η (cp) | Δn | Δε |
|---|---|---|---|---|
| C1 | 75.6 | 26.6 | 0.132 | 10.9 |
| C2 | 72.2 | 25.4 | 0.139 | 11.0 |
| C3 | 63.1 | 20.3 | 0.115 | 10.0 |
| C4 | 61.0 | 23.9 | 0.122 | 11.0 |
| C5 | 59.0 | 21.2 | 0.118 | 10.4 |
| C6 | 53.3 | 24.4 | 0.120 | 10.4 |
| C7 | 69.3 | 26.7 | 0.126 | 13.0 |
| ZLI-1083 | 52.3 | 21.7 | 0.119 | 10.7 |

As apparent from Table 3, the compounds of the general formula (III) are relatively low in viscosity and have a high clearing point, although they are compounds having three rings. Moreover, they have the common physical properties, for example, positive dielectric anisotropy.

When two or more of the compounds of the general formula (III) are used in combination with each other, the proportions of the compounds used are not critical and can be determined appropriately depending on the desired characteristics of the liquid crystal composition.

The fourth components of the present invention comprises one or more of the compounds represented by the general formula (IV), specifically the compounds represented by the following general formulas:

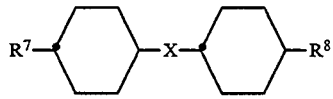

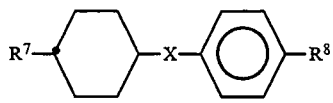

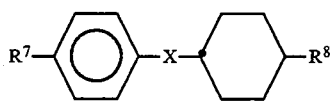

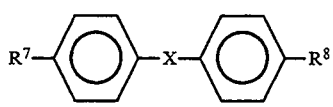

(wherein $R^7$, $R^8$ and X are the same as defined above). More specifically, the compounds represented by the general formulas shown below are used.

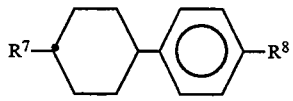

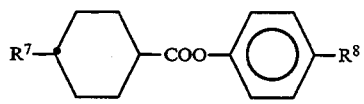

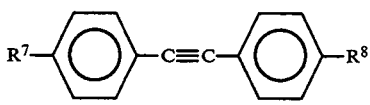

(wherein $R^7$ and $R^8$ are the same as defined above).

Of the above compounds, compounds represented by the general formula:

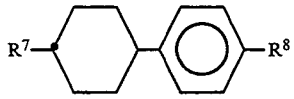

(wherein $R^7$ and $R^8$ are the same as defined above) are preferably used, with compounds in which $R^7$ is a straight alkyl group having 2 to 5 carbon atoms, and $R^8$ is a straight alkoxy group having 2 to 5 carbon atoms being particularly preferred.

Examples of such preferred compounds are shown below.

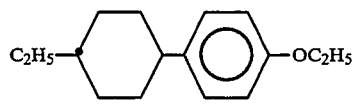

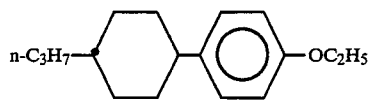

The compounds of the general formula (IV) are known and are described, for example, in Japanese Patent Application Laid-Open Nos. 167535/1983, 70624/1984, U.S. Pat. No. 4,130,502, and French Patent 2,141,438.

Compounds (D1) to (D5) shown below, as selected from the compounds of the general formula (IV) were dissolved each in a proportion of 15% by weight in a commercially available cyclohexylbenzonitrile-based liquid crystal (trade name: ZLI-1132, produced by Merck & Co.), and measured for physical properties. The results are shown in Table 4.

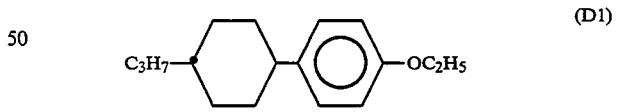

(D1)

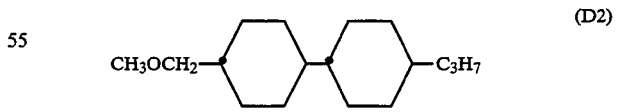

(D2)

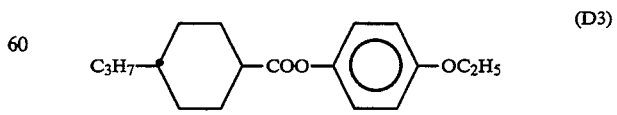

(D3)

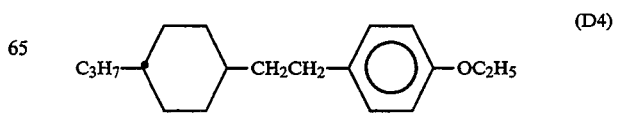

(D4)

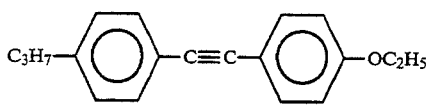

TABLE 4

| | NI (°C.) | η (cp) | Δn | Δε |
|---|---|---|---|---|
| D1 | 64.1 | 21.7 | 0.124 | 10.0 |
| D2 | 67.3 | 20.6 | 0.115 | 9.7 |
| D3 | 70.2 | 26.6 | 0.125 | 9.4 |
| D4 | 65.1 | 22.1 | 0.124 | 9.7 |
| D5 | 70.8 | 22.8 | 0.157 | 9.9 |
| ZLI-1132 | 72.4 | 27.0 | 0.137 | 11.0 |

As apparent from Table 4, the compounds of the general formula (IV) are low in viscosity and have a relatively low clearing point. Moreover, they have the common physical properties, for example, negative dielectric anisotropy.

When two or more of the compounds of the general formula (IV) are used in combination with each other, the proportions of the compounds used are not critical and can be determined appropriately depending on the desired characteristics of the liquid crystal composition.

The liquid crystal composition of the present invention, in one embodiment thereof, contains the above first, second, and third components as main components.

The proportion of the first component is 10 to 60% by weight, preferably 15 to 50% by weight based on the total weight of the liquid crystal composition. If the proportion of the first component is more than 60% by weight, the clearing point decreases, and the change in color of the display cell as described above is likely to occur. On the other hand, if the proportion of the first component is less than 10% by weight, the characteristics required for displays of the SBE mode are difficult to be satisfied, and in particular, the steepness of the voltage-transmittance curve is reduced.

The proportion of the second component is 10 to 40% by weight, preferably 15 to 40% by weight based on the total weight of the liquid crystal composition. If the proportion of the second component is more than 40% by weight, the lower limit temperature of the nematic phase often rises to narrow the operating temperature range. On the other hand, if the proportion of the second component is less than 10% by weight, the clearing point becomes low, and the change in color of the display cell is undesirably produced.

The proportion of the third component is 10 to 40% by weight, preferably 20 to 40% by weight based on the total weight of the liquid crystal composition. If the proportion of the third component is more than 40% by weight, the lower limit temperature of the nematic phase often rises to reduce operating temperature range. On the other hand, if the proportion of the third component is less than 10% by weight, the clearing point often becomes low, and the change in color of the display cell is undesirably produced.

In another embodiment, the liquid crystal composition of the present invention contains the first, second, third, and fourth components as main components.

The proportions of the first, second, and third components are the same as in the aforementioned liquid crystal composition. That is, the proportion of the first component is 10 to 60% by weight and preferably 5 to 50% by weight; the proportion of the second component is 10 to 40% by weight and preferably 15 to 40% by weight; and the proportion of the third component is 10 to 40% by weight and preferably 20 to 40% by weight, all based on the total weight of the liquid crystal composition.

The proportion of the fourth component is 10 to 40% by weight, preferably 10 to 20% by weight based on the total weight of the liquid crystal composition. If the proportion of the fourth component is more than 40% by weight, the clearing point of the resulting liquid crystal composition may decrease and the change in color of the display cell may occur. On the other hand, if the proportion of the fourth component is less than 10% by weight, the viscosity often increases, lengthening the response time.

The liquid crystal composition of the present invention may contain, as well as the aforementioned components, suitable amounts of one or more of other generally known nematic liquid crystals or mesogenic compounds for the purpose of controlling threshold voltage, liquid crystal temperature range, or viscosity, for example, but within the range such that they do not deteriorate the effects of the present invention.

Examples of compounds which can be preferably used in the present invention are shown below.

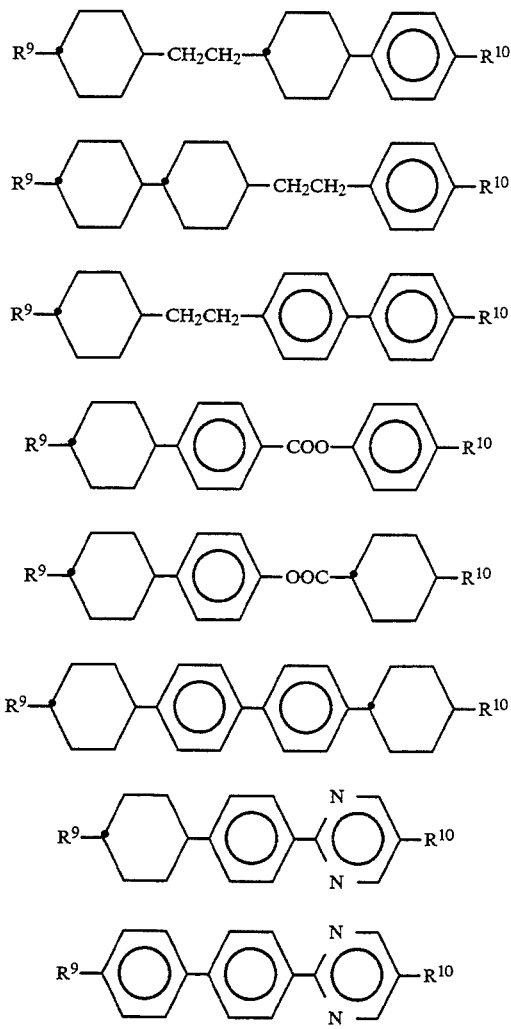

-continued

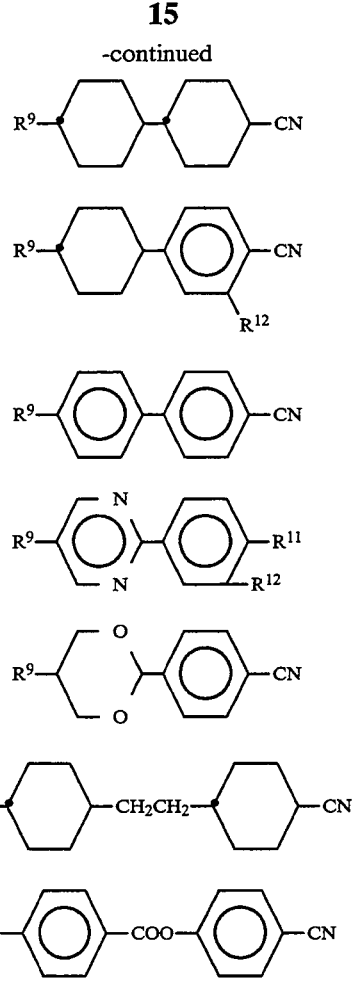

(wherein $R^9$ is an alkyl group having 1 to 10 carbon atoms, an alkoxymethyl group having 1 to 11 carbon atoms, or F; $R^{10}$ is an alkyl group having 1 to 10 carbon atoms, an alkoxy group having 1 to 10 carbon atoms, or F; $R^{11}$ is an alkyl group having 1 to 10 carbon atoms, an alkoxy group having 1 to 10 carbon atoms, F, or a CN group; and $R^{12}$ is H or F).

In preparation of liquid crystal compositions by adding the aforementioned known nematic liquid crystals or mesogenic compounds to the first, second, and third components, or the first, second, third, and fourth components, they are added so that the total amount of the first, second, and third components is at least 50% by weight, preferably at least 60% by weight of the liquid crystal composition, or the total amount of the first, second, third, and fourth components is at least 50% by weight, preferably at least 60% by weight of the liquid crystal composition. If the total amount of the first, second, and third components, or the first, second, third, and fourth components is less than 50% by weight of the liquid crystal composition, in some cases, the steepness of the voltage-transmittance curve, low viscosity, wide nematic range, and other characteristics particularly required for the SBE mode cannot be obtained.

The liquid crystal display of the present invention can be produced by known techniques except that the aforementioned liquid crystal composition is used as a liquid crystal. For example, it can be produced by the following process.

First, a pattern electrode is formed in a transparent electrode substrate. After formation of a molecular aligning layer on the transparent electrode substrate employing an aligning agent, a cell is fabricated. After the cell is sealed with a spacer, for example, the liquid crystal composition is introduced into the cell through a filling hole, and then the hole is sealed. Attachments such as polarizers and reflective plates are attached to obtain a liquid crystal display.

The liquid crystal composition of the present invention is greatly improved in the steepness of the voltage-transmittance curve, while maintaining a high clearing point, a low viscosity, and a controllable Δn. That is, the liquid crystal composition of the present invention has a high clearing point, and a low viscosity, and is controllable in Δn, and furthermore, it is excellent in the steepness of the voltage-transmittance curve.

As the liquid crystal composition of the present invention has, as described above, characteristics required for the SBE mode, it is more suitable to use the composition in SBE mode displays than in conventional TN mode displays. In view of these characteristics, the liquid crystal composition of the present invention realizes multiplexing of more than 1/100 duty cycle in the SBE mode.

The liquid crystal composition of the present invention can be used in liquid crystal displays of the 90° TN mode in which the steepness of voltage-transmittance curve is not so important, but high thermal stability and low viscosity are required.

The present invention is described in greater detail with reference to the following examples.

In the examples, characteristic values of liquid crystal compositions were measured by the following methods.

Steepness of Voltage-Transmittance Curve

Assuming that voltages at which transmittance of light in an optical axis direction vertical to a display surface are 10% and 80% of a saturated value, which correspond to $V_{10}$ and $V_{80}$, respectively, the steepness of voltage-transmittance curve is evaluated by a parameter ($\alpha$) defined by the equation:

$$\alpha = V_{80}/V_{10}$$

wherein $V_{10}$=threshold voltage.

As the parameter ($\alpha$) more approaches to 1, voltage-transmittance curve becomes more steep.

$V_{10}$ and $V_{80}$ are measured by the following method.

A test sample is prepared by adding a chiral substance (trade name: S-811, produced by Merck & Co.) to a liquid crystal composition in such a manner that d/p=0.42 (wherein d represents a cell thickness, and p represents an intrinsic helical pitch of a chiral nematic liquid crystal) at which there is no formation of either lower twist or striped domain. This sample is introduced into a cell which has a polyimide-based aligning film (trade name: PSI-871-PPP, produced by Chisso Corp.) subjected to rubbing, on the opposing plane transparent electrodes, and which has a twist angle of 180° under the condition that Δn·d=800 nm. Polarizing plates are bonded to the top and bottom of the cell in such a manner that the rubbing direction of the aligning film and the absorption axis of the polarizing plate are at an angle of 45° and the absorption axes of the upper and lower polarizing plates are overlapped. Thereafter, $V_{10}$ and $V_{80}$ is measured.

The above aligning film has a pretilt angle of 3.5° when a phenylcyclohexane-based liquid crystal composition (trade name: ZLI-1132, produced by Merck & Co.) is employed. The pretilt angle is measured by the crystal rotation method (T.J. Sheffer et al., Journal of Applied Physics, Vol. 48, No. 5, pp. 1783–1792 (1977)).

Number of Multiplexing

The number of multiplexing is evaluated by a parameter Nmax defined by the following equation:

$$N\max = \left(\frac{a^2 + 1}{a^2 - 1}\right)^2$$

As the parameter Nmax increases, higher multiplexing becomes possible.

Viscosity ($\eta$)

Measured with a rotation viscometer (E-type viscometer manufactured by Tokyo Keiki Co., Ltd.).

Clearing Point (NI)

Measured by an automatic melting point measuring apparatus (FP5, FP52 manufactured by Mettler Instrumente AG.).

Refractive Index Anisotropy ($\Delta$n)

Measured by the use of Micro-Refractometer (manufactured by Ernst Leitz Gmbh Wetzlar) (wavelength: 589 nm)

Elastic Constants ($K_{11}$, $K_{22}$, $K_{33}$)

By applying various voltages across a homogeneous or 90° twisted liquid crystal in a direction vertical to the molecular axes of the liquid crystal, a capacitance-voltage curve is drawn. Then, a theoretical curve obtained from the aforementioned Frank's continuum theory is approximated to the curve obtained above to thereby determine the elastic constants.

In the examples, percents (%) are all by weight. Alkyl and alkoxy groups represented by the chemical formulas are all straight.

Example 1

First Component:

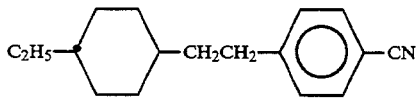 10%

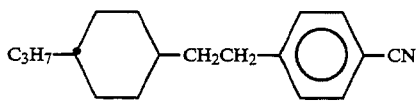 15%

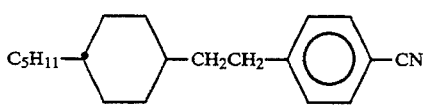 15%,

Second Component:

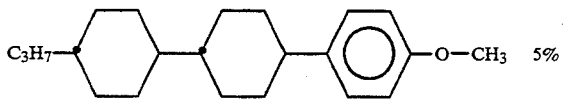 5%

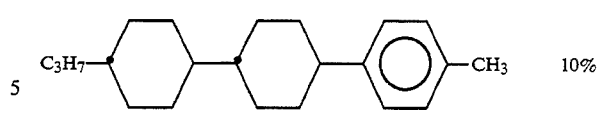 10%

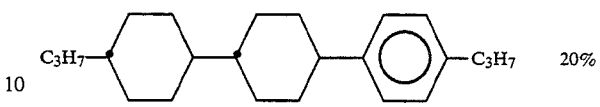 20%

Third Component:

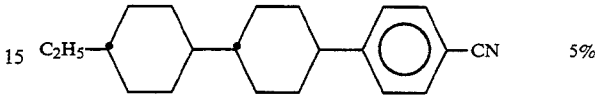 5%

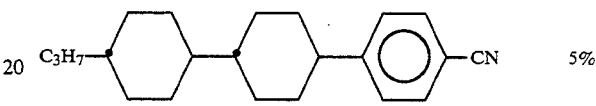 5%

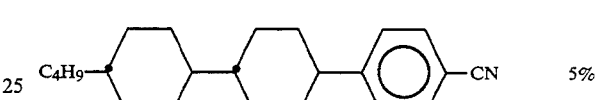 5%

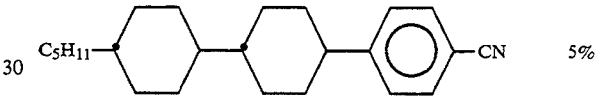 5%

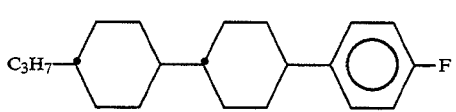 5%

The above compounds were mixed to prepare a liquid crystal composition. Characteristic values of the liquid crystal composition are shown in Table 5.

First Component:

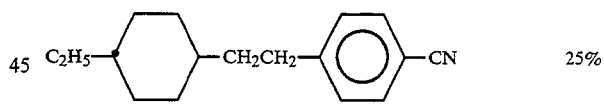 25%

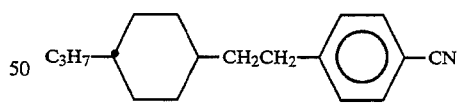 15%

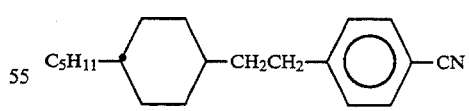 15%,

Second Component:

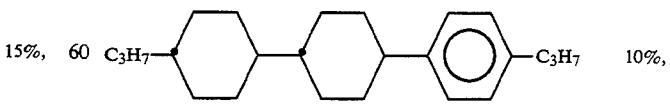 10%,

Third Component:

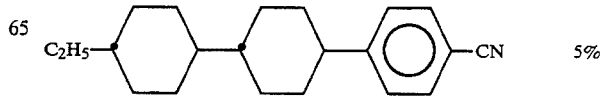 5%

-continued

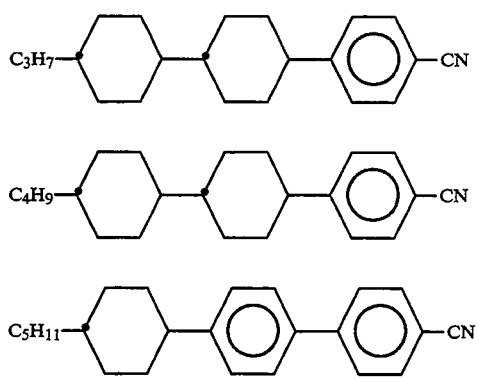 5%

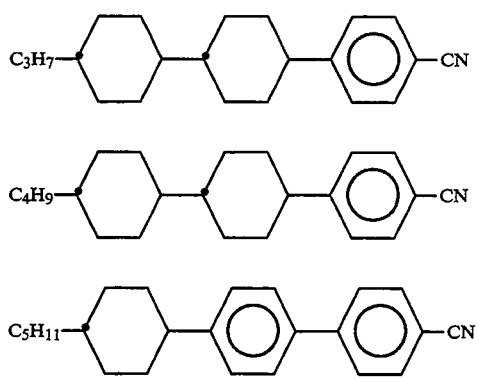 5%

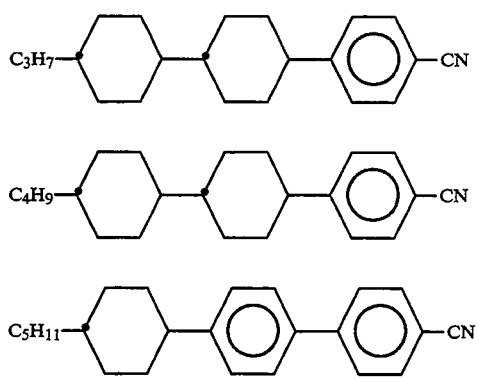 20%.

The above compounds were mixed to prepare a liquid crystal composition. Characteristic values of the composition are shown in Table 5.

Example 3

First Component:

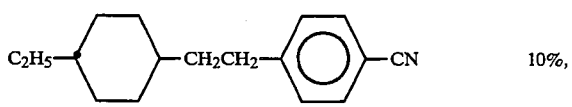 10%,

Second Component:

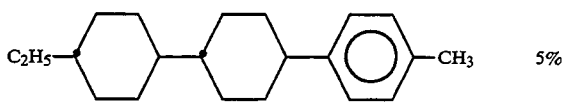 5%

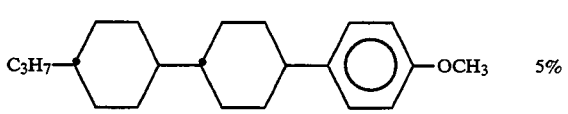 5%

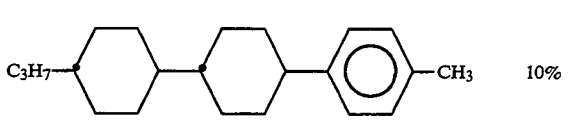 10%

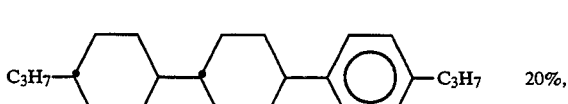 20%,

Third Component:

 5%

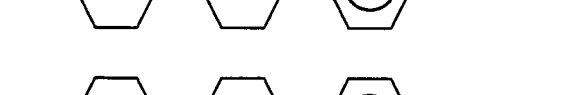 5%

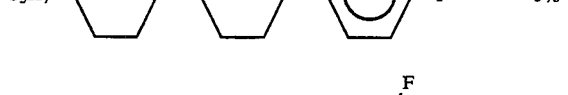 10%

-continued

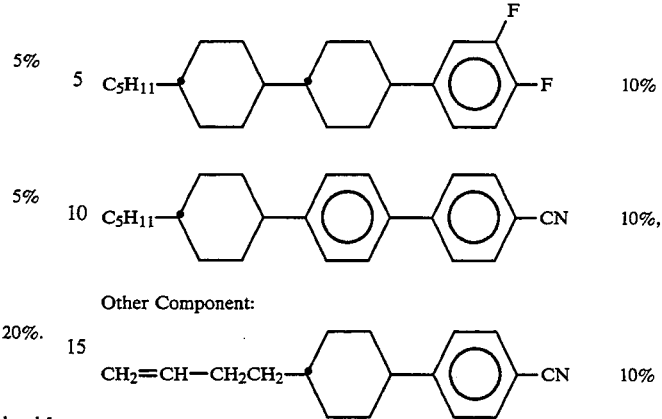 10%

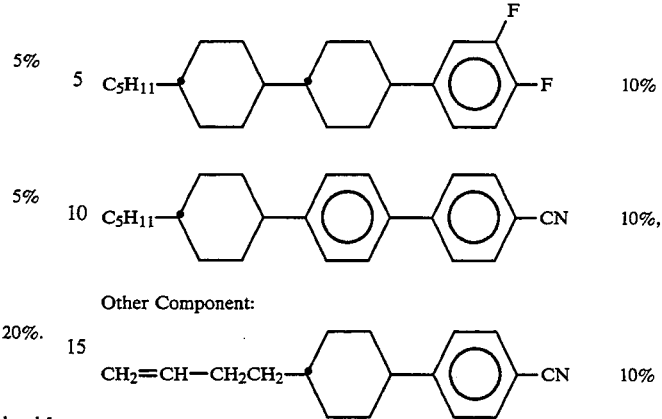 10%,

Other Component:

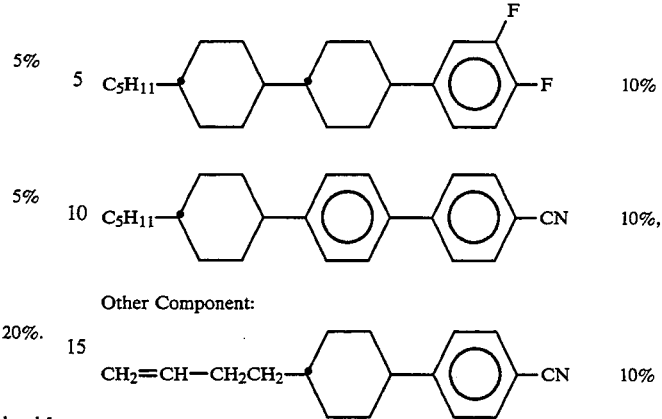 10%

The above compounds were mixed to prepare a liquid crystal composition. Characteristic value of the liquid crystal composition are shown in Table 5

Example 4

First Component:

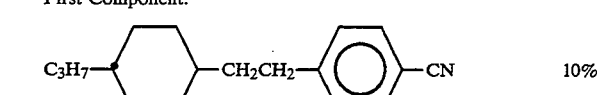 10%

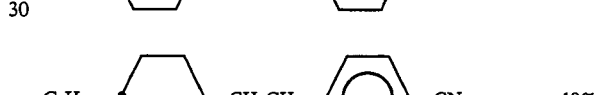 10%,

Second Component:

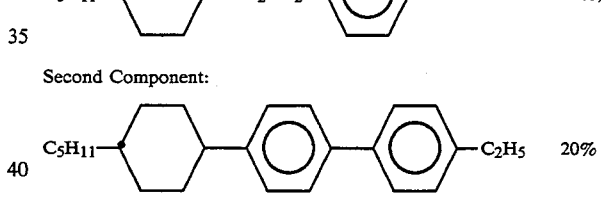 20%

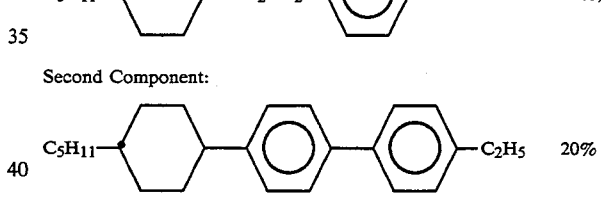 20%,

Third Component:

 5%

 5%

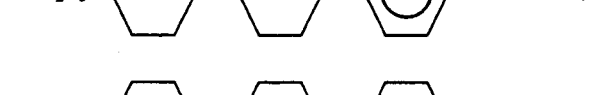 10%

Other Component:

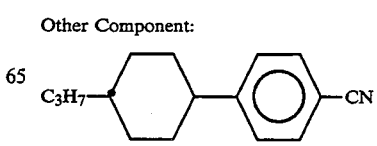 10%

-continued

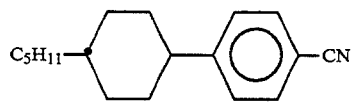 10%

The above compounds were mixed to prepare a liquid crystal composition. Characteristic values of the liquid crystal composition are shown in Table 5

Example 5

First Component:

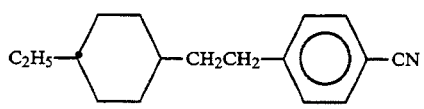 15%

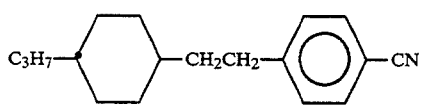 15%

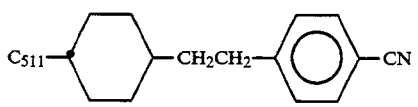 15%,

Second Component:

 5%

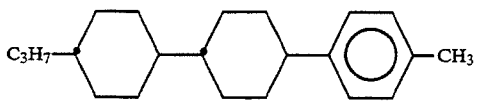 10%

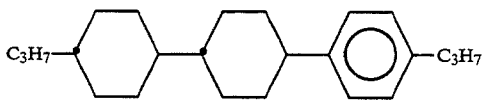 20%

Third Component:

 10%

Fourth Component:

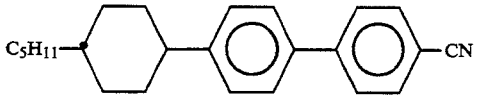 10%.

The above compounds were mixed to prepare a liquid crystal composition. Characteristic values of the liquid crystal composition are shown in Table 5.

Example 6

First Component:

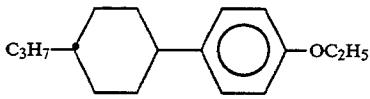 10%,

Second Component:

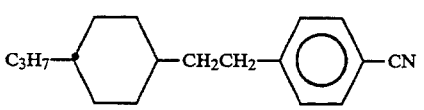

-continued

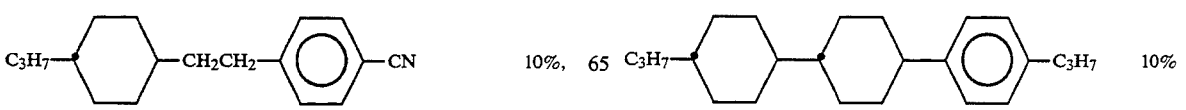

The above compounds were mixed to prepare a liquid crystal composition. Characteristic values of the liquid crystal composition are shown in Table 5.

Example 7

First Component:

Third Component:

-continued

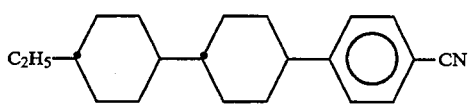 5%

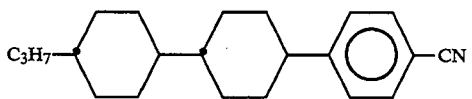 5%

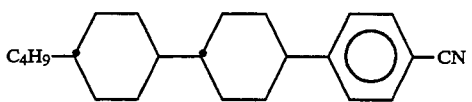 5%

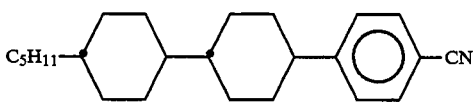 5%

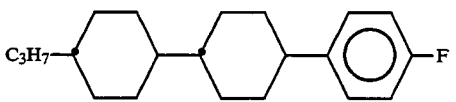 5%

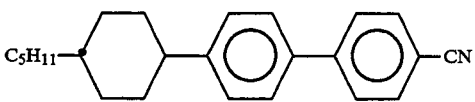 10%,

Fourth Component:

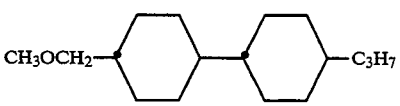 10%

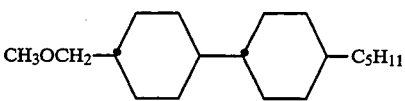 5%.

The above compounds were mixed to prepare a liquid crystal composition. Characteristic values of the liquid crystal composition are shown in Table 5.

Example 8

First Component:

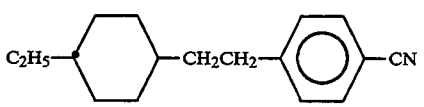 15%

Second Component:

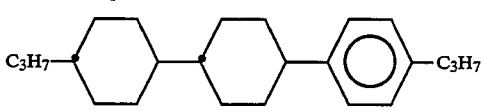 15%

Third Component:

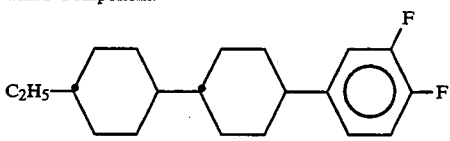 10%

-continued

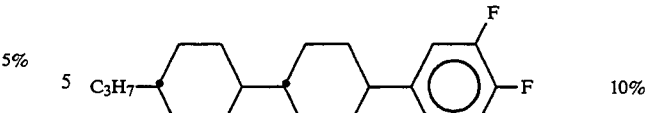 10%

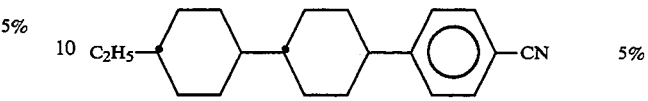 5%

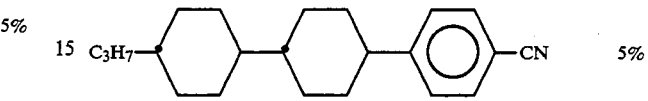 5%

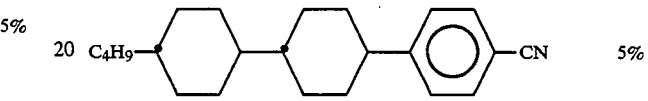 5%

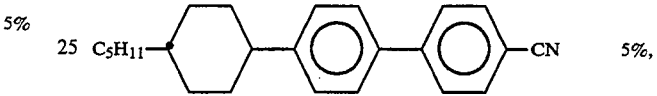 5%,

Fourth Component:

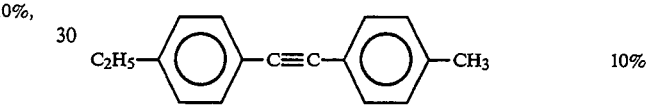 10%

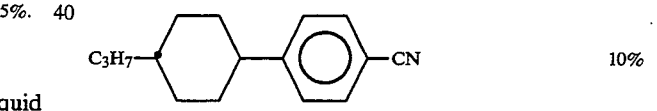 10%,

Other Component:

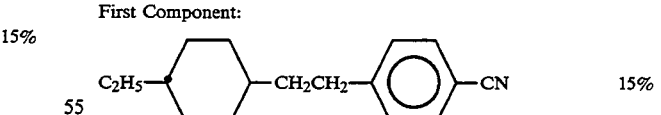 10%

The above compounds were mixed to prepare a liquid crystal composition. Characteristic values of the liquid crystal composition are shown in Table 5.

Example 9

First Component:

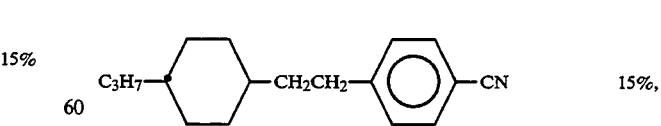 15%

 15%,

Second Component:

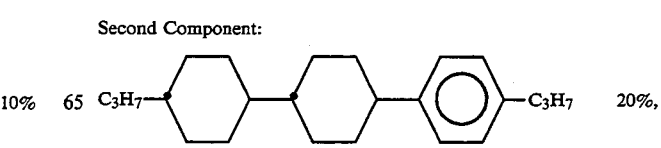 20%,

Third Component:

-continued

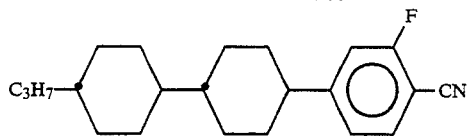 10%

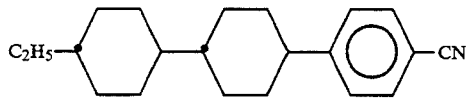 5%

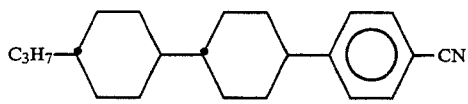 5%,

Fourth Component:

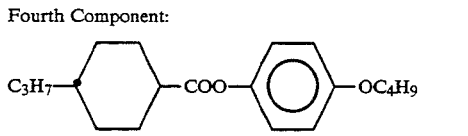 10%

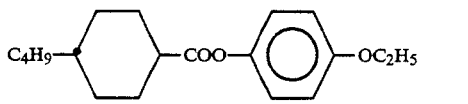 10%,

Other Component:

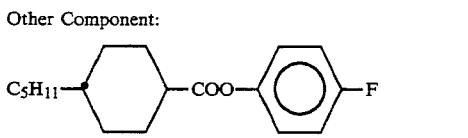 8%

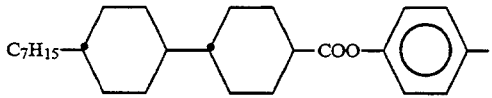 2%

The above compounds were mixed to prepare a liquid crystal composition. Characteristic values of the liquid crystal composition are shown in Table 5.

Comparative Example

For comparison, compounds conventionally used, as shown below were mixed to prepare a liquid crystal composition. Characteristic values of the liquid crystal composition are shown in Table 5.

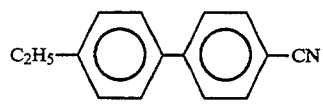 15%

 10%

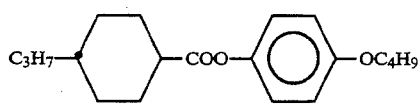 18%

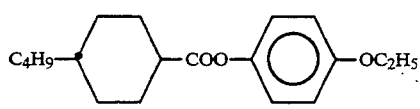 12%

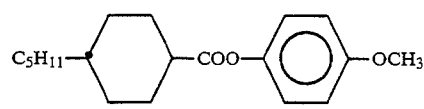 12%

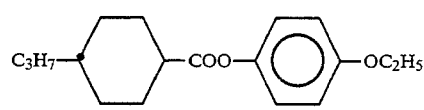 10%

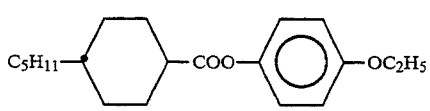 8%

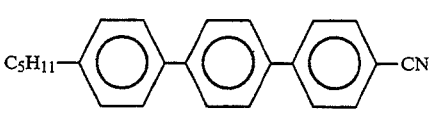 15%

TABLE 5

|  | NI (°C.) | $\Delta n$ | $\eta$ (cp) | $V_{10}$ (V) | $\alpha$ | Nmax | $K_{33}/K_{11}$ |
|---|---|---|---|---|---|---|---|
| Example |  |  |  |  |  |  |  |
| 1 | 117.3 | 0.116 | 33.3 | 2.200 | 1.098 | 115 | 1.88 |
| 2 | 93.9 | 0.141 | 37.4 | 1.760 | 1.093 | 127 | 1.98 |
| 3 | 132 | 0.106 | 30.0 | 2.340 | 1.070 | 219 | 2.12 |
| 4 | 121.3 | 0.139 | 30.5 | 2.080 | 1.095 | 122 | 1.82 |
| 5 | 88.1 | 0.116 | 23.1 | 2.040 | 1.080 | 169 | 1.80 |
| 6 | 100.2 | 0.123 | 22.5 | 2.060 | 1.098 | 115 | 1.48 |
| 7 | 97.9 | 0.119 | 29.2 | 1.980 | 1.072 | 207 | 1.98 |
| 8 | 97.2 | 0.141 | 23.8 | 1.860 | 1.088 | 141 | 1.58 |
| 9 | 91.3 | 0.104 | 25.8 | 1.850 | 1.088 | 141 | 1.70 |
| Com. Example |  |  |  |  |  |  |  |
| 1 | 81.2 | 0.155 | 43.8 | 1.600 | 1.130 | 68 | 1.04 |

$\Delta n$, $V_{10}$, $\alpha$, Nmax, $K_{33}/K_{11}$: measured at 25° C.
$\eta$: measured at 20° C.

What is claimed is:

1. A liquid crystal composition consisting essentially of:

at least one compounds represented by the general formula (I) (first component);

at least one compound represented by the general formula (II) (second component); and at least one compound represented by the general formula (III) (third component) as main components:

General Formula (I):

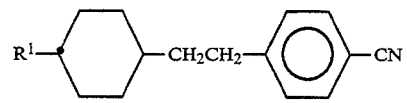

wherein $R^1$ is an alkyl group having 1 to 10 carbon atoms;

General Formula (II):

$R^2$—⬡—⬡(A)—◯—$R^3$ wherein $R^2$ is an alkyl group having 1 to 10 carbon atoms; $R^3$ is an alkyl group or an alkoxy group having 1 to 10 carbon atoms, and

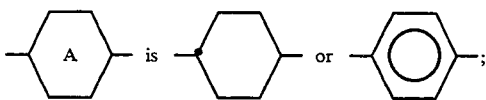

General Formula (III):

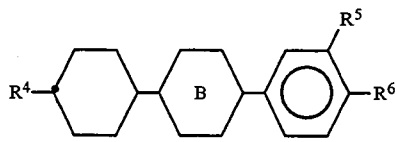

wherein $R^4$ is an alkyl group having 1 to 10 carbon atoms; $R^5$ is H; $R^6$ is a CN group, and

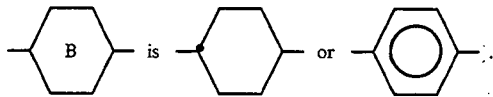

2. The composition as claimed in claim 1, wherein the proportions of the first component, the second component, and the third component in the composition are 10 to 60% by weight, 10 to 40% by weight, and 10 to 40% by weight, respectively, based on the total weight of the composition, and the total amount of the first component, the second component, and the third component is at least 50% by weight of the composition.

3. A liquid crystal composition as claimed in claim 1, consisting essentially of:
   at least one compounds represented by the general formula (I) (first component);
   at last one compound represented by the general formula (II) (second component);
   at least one compound represented by the general formula (III) (third component) as main components:

General Formula (I):

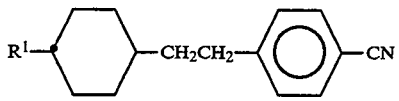

General Formula (II):

General Formula (III):

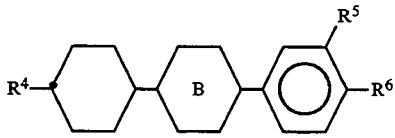

General Formula (IV):

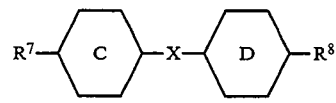

wherein $R^7$ is an alkyl group having 1 to 10 carbon atoms or an alkoxymethyl group having 1 to 11 carbon atoms, $R^8$ is an alkyl group having 1 to 10 carbon atoms, or an alkoxy group having 1 to 10 carbon atoms,

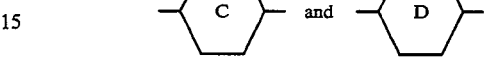

may be the same or different and are independently

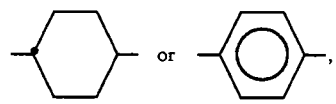

and X is a single bond, —COO—, or —C≡C—.

4. The composition as claimed in claim 3, wherein the proportions of the first component, the second component, the third component, and the fourth component in the composition is 10 to 60% by weight, 10 to 40% by weight, and 10 to 40% by weight, and 10 to 40% by weight, respectively, based on the total weight of the composition, and the amounts of the first component, the second component, the third component, and the fourth component are at least 50% by weight of the composition.

5. The composition as claimed in claim 1 wherein the first component is at least one compound selected from the compounds of the general formula (I) in which $R^1$ is a straight alkyl group having 2 to 5 carbon atoms.

6. The composition as claimed in claim 1 wherein the second component is at least one compound selected from the compounds represented by the general formula (II) in which $R^2$ is a straight alkyl group having 2 to 5 carbon atoms, and $R^3$ is a straight alkyl group having 1 to 5 carbon atoms, or a straight alkoxy group having 1 to 5 carbon atoms.

7. The composition as claimed in claim 1 wherein the third component is at least one compound selected from the compounds of the general formula (III) in which $R^4$ is a straight alkyl group having 2 to 5 carbon atoms.

8. The composition as claimed in claim 1 wherein the first component is at least one compound selected from the compounds represented by the general formula (I) wherein $R^1$ is a straight alkyl group having 2 to 5 carbon atoms, the second component is at least one compound selected from the compounds represented by the general formula (II) in which $R^2$ is a straight alkyl group having 2 to 5 carbon atoms and $R^3$ is a straight alkyl group having 1 to 5 carbon atoms or a straight alkoxy group having 1 to 5 carbon atoms, and the third component is at least one compound selected from the compounds represented by the general formula (III) in which $R^4$ is a straight alkyl group having 2 to 5 carbon atoms.

9. The composition as claimed in claim 3 wherein the fourth component is at least one compound selected from the compounds represented by the general formula (IV) in which $R^7$ is a straight alkyl group having 2 to 5 carbon atoms, or a straight alkoxymethyl group having 2 to 5 carbon atoms, and $R^8$ is a straight alkyl group having 2 to 5 carbon atoms or a straight alkoxy group having 2 to 5 carbon atoms.

10. The composition as claimed in claim 3 wherein the first component is at least one compound selected from the compounds represented by the general formula (I) wherein $R^1$ is a straight alkyl group having 2 to 5 carbon atoms, the second component is at least one compound selected from the compounds represented by the general formula (II) in which $R^2$ is a straight alkyl group having 2 to 5 carbon atoms or a straight alkoxy group having 1 to 5 carbon atoms, the third component is at least one compound selected from the compounds represented by the general formula (III) in which $R^4$ is a straight alkyl group having 2 to 5 carbon atoms, and the fourth component is at least one compound selected from the compounds represented by the general formula (IV) in which $R^7$ is a straight alkyl group having 2 to 5 carbon atoms, or a straight alkoxymethyl group having 2 to 5 carbon atoms, and $R^8$ is a straight alkyl group having 2 to 5 carbon atoms or a straight alkoxy group having 2 to 5 carbon atoms.

11. The composition as claimed in claim 1, further including other liquid crystals or mesogenic compounds.

12. The composition as claimed in claim 3, further including, other liquid crystals or mesogenic compounds.

13. A liquid crystal display using the liquid crystal composition of claim 1.

14. A liquid crystal display using the liquid crystal composition of claim 3.

15. The composition as claimed in claim 2 wherein the first component is at least one compound selected from the compounds of the general formula (I) in which $R^1$ is a straight alkyl group having 2 to 5 carbon atoms.

16. The composition as claimed in claim 3 wherein the first component is at least one compound selected from the compounds of the general formula (I) in which $R^1$ is a straight alkyl group having 2 to 5 carbon atoms.

17. The composition as claimed in claim 4 wherein the first component is at least one compound selected from the compounds of the general formula (I) in which $R^1$ is a straight alkyl group having 2 to 5 carbon atoms.

18. The composition as claimed in claim 2 wherein the second component is at least one compound selected from the compounds represented by the general formula (II) in which $R^2$ is a straight alkyl group having 2 to 5 carbon atoms, and $R^3$ is a straight alkyl group having 1 to 5 carbon atoms, or a straight alkoxy group having 1 to 5 carbon atoms.

19. The composition as claimed in claim 3 wherein the second component is at least one compound selected from the compounds represented by the general formula (II) in which $R^2$ is a straight alkyl group having 2 to 5 carbon atoms, and $R^3$ is a straight alkyl group having 1 to 5 carbon atoms, or a straight alkoxy group having 1 to 5 carbon atoms.

20. The composition as claimed in claim 4 wherein the second component is at least one compound selected from the compounds represented by the general formula (II) in which $R^2$ is a straight alkyl group having 2 to 5 carbon atoms, and $R^3$ is a straight alkyl group having 1 to 5 carbon atoms, or a straight alkoxy group having 1 to 5 carbon atoms.

21. The composition as claimed in claim 2 wherein the third component is at least one compound selected from the compounds of the general formula (III) in which $R^4$ is a straight alkyl group having 2 to 5 carbon atoms.

22. The composition as claimed in claim 3 wherein the third component is at least one compound selected from the compounds of the general formula (III) in which $R^4$ is a straight alkyl group having 2 to 5 carbon atoms.

23. The composition as claimed in claim 4 wherein the third component is at least one compound selected from the compounds of the general formula (III) in which $R^4$ is a straight alkyl group having 2 to 5 carbon atoms.

24. The composition as claimed in claim 2 wherein the first component is at least one compound selected from the compounds represented by the general formula (I) wherein $R^1$ is a straight alkyl group having 2 to 5 carbon atoms, the second component is at least one compound selected from the compounds represented by the general formula (II) in which $R^2$ is a straight alkyl group having 2 to 5 carbon atoms and $R^3$ is a straight alkyl group having 1 to 5 carbon atoms or a straight alkoxy group having 1 to 5 carbon atoms, and the third component is at least one compound selected from the compounds represented by the general formula (III) in which $R^4$ is a straight alkyl group having 2 to 5 carbon atoms.

25. The composition as claimed in claim 4 wherein the fourth component is at least one compound selected from the compounds represented by the general formula (IV) in which $R^7$ is a straight alkyl group having 2 to 5 carbon atoms or a straight alkoxymethyl group having 2 to 5 carbon atoms, and $R^8$ is a straight alkyl group having 2 to 5 carbon atoms or a straight alkoxy group having 2 to 5 carbon atoms.

26. The composition as claimed in claim 4 wherein the first component is at least one compound selected from the compounds represented by the general formula (I) wherein $R^1$ is a straight alkyl group having 2 to 5 carbon atoms, the second component is at least one compound selected from the compounds represented by the general formula (II) in which $R^2$ is a straight alkyl group having 2 to 5 carbon atoms or a straight alkoxy group having 1 to 5 carbon atoms, the third component is at least one compound selected from the compounds represented by the general formula (III) in which $R^4$ is a straight alkyl group having 2 to 5 carbon atoms, and the fourth component is at least one compound selected from the compounds represented by the general formula (IV) in which $R^7$ is a straight alkyl group having 2 to 5 carbon atoms or a straight alkoxymethyl group having 2 to 5 carbon atoms and $R^8$ is a straight alkyl group having 2 to 5 carbon atoms or a straight alkoxy group having 2 to 5 carbon atoms.

27. The composition as claimed in claim 2, further including other liquid crystals or mesogenic compounds.

28. The composition as claimed in claim 4, further including other liquid crystals or mesogenic compounds.

29. A liquid crystal display using the liquid crystal composition of claim 2.

30. A liquid crystal display using the liquid crystal composition of claim 4.

31. The composition as claimed in claim 1 wherein said composition includes a voltage-transmission curve having a value of no more than about 1.098 and an elastic constant ratio, $K_{33}/K_{11}$, of at least about 1.48.

32. A liquid crystal display according to claim 13 wherein said composition includes a voltage-transmission curve having a value of no more than about 1.098 and an elastic constant ratio, $K_{33}/K_{11}$, of at least about 1.48.

33. The composition as claimed in claim 1 wherein said liquid crystal composition produces a super twisted birefringence effect display.

34. A liquid crystal display according to claim 13 wherein said liquid crystal composition produces a super twisted birefringence effect display.

* * * * *

UNITED STATES PATENT AND TRADEMARK OFFICE
CERTIFICATE OF CORRECTION

PATENT NO. : 5,354,503
DATED : October 11, 1994
INVENTOR(S) : Sawada et al.

It is certified that error appears in the above-indentified patent and that said Letters Patent is hereby corrected as shown below:

Column 26, Line 43, change "compounds" to --compound--;

Column 27, Line 37, change "compounds" to --compound--;

Line 39, change "last" to --least--;

Line 42, insert new paragraph, --At least one compound represented by the general formula (III) (third component; and--;

Line 44, change "(III) (third component)"' to --(IV) (fourth component)--;

Column 29, Line 29, delete ",".

Signed and Sealed this

Seventh Day of March, 1995

Attest:

BRUCE LEHMAN

*Attesting Officer*      *Commissioner of Patents and Trademarks*